J. R. DEVOR.
Mechanical Movement.

No. 162,538.  Patented April 27, 1875.

WITNESSES:
Chas. Nida
Alex F. Roberts

INVENTOR:
J. R. Devor
BY
ATTORNEYS.

UNITED STATES PATENT OFFICE.

JAMES R. DEVOR, OF GOSHEN, INDIANA.

IMPROVEMENT IN MECHANICAL MOVEMENTS.

Specification forming part of Letters Patent No. 162,538, dated April 27, 1875; application filed March 29, 1875.

*To all whom it may concern:*

Be it known that I, JAMES R. DEVOR, of Goshen, in the county of Elkhart and State of Indiana, have invented a new and useful Improvement in Mechanical Movements, of which the following is a specification:

This invention relates to a new mechanical device, by means of which belt-pulleys, cogged gearing, and other mechanisms may be made to run on shafts which are not parallel to each other; and it consists of a journal and bearings formed of a ball and ball-socket and grooves and pins, the construction being hereinafter more fully described.

Figure 1:
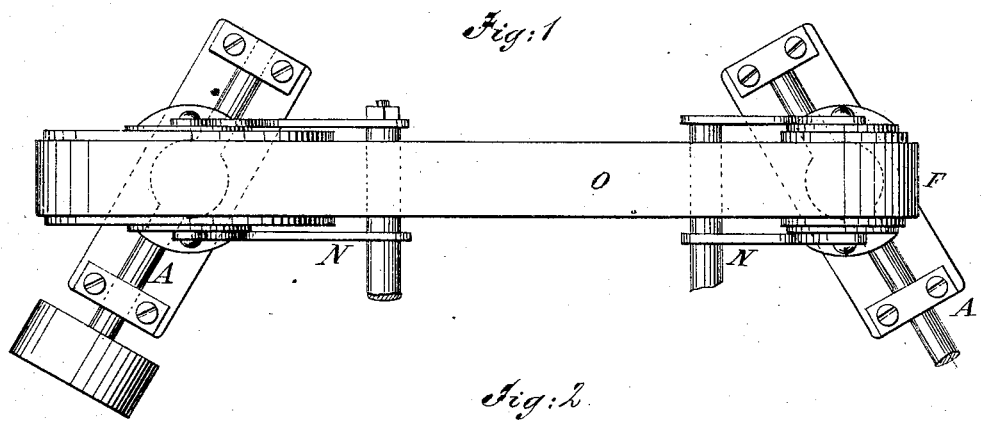
Figure 2:
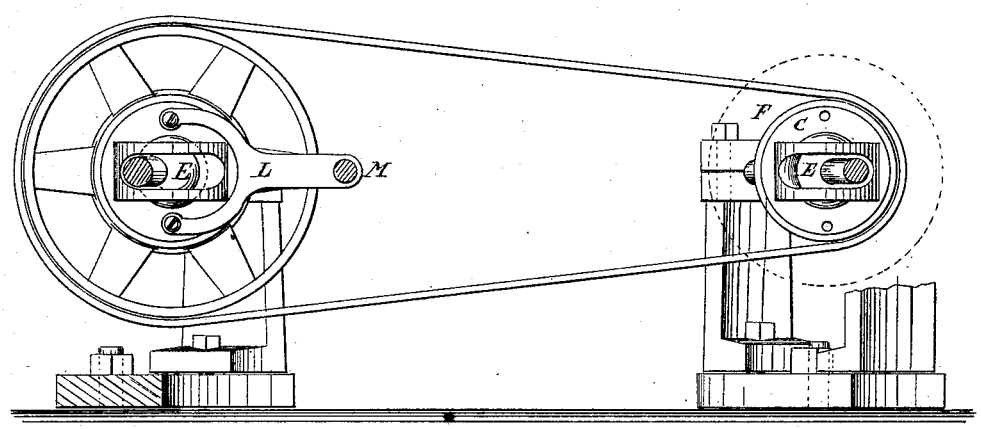
Figure 3:
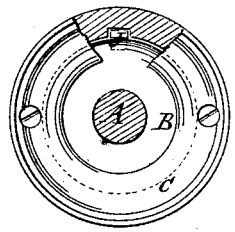
Figure 4:
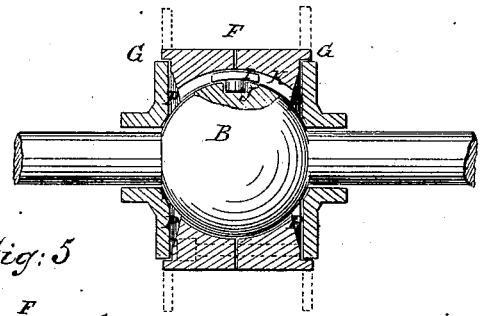
Figure 5:
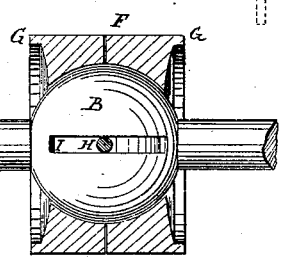

In the accompanying drawing, Figure 1 is a top view, showing two belt-pulleys placed on shafts, which are not parallel with each other. Fig. 2 is a side elevation of the same. Fig. 3 is a side view of the box and ball, showing pins in the ball and grooves in the box for driving the pulley or gear-wheels. Fig. 4 is another view of the same. Fig. 5 shows a groove in the ball and pin for driving the pulley or wheels.

Similar letters of reference indicate corresponding parts.

A represents the shafts. B are the balls fastened tightly on the shafts. C represents a portion of the ball-sockets, being two disks, having each a broad slot, E, through which the shaft A passes. These slots allow the shaft to turn in either direction, to the right or left, substantially as seen in Fig. 1. A cross-section of the disks and the pulleys is seen in Figs. 4 and 5. F represents the pulleys, the insides or hubs of which form the box, and are made concave to fit the ball, having flanges which lap onto the disks, as seen at G G. The pulley is carried or revolved by the pins H through the pulley, and the slots I in the ball on opposite sides, as seen in Fig. 5; or this order may be reversed, and the slots be made in the box, with the pin put in the ball, substantially as seen in Figs. 3 and 4, where J represents the pin, and K the slot. Instead of a pulley for a belt, bevel-gear wheels may be employed when the concave hub of the pulley would form the hub of the gear-wheel, and be otherwise constructed in the same or a similar manner. Attached to the disks C on each or opposite sides of the ball are yokes L L, connected together by the rod $m$, which support the belt-guide N. (See Fig. 1.) These belt-guides may be arranged in any other suitable manner to suit the position of the ball and socket, or the guides may be dispensed with altogether in some cases. O represents the belt. The spaces P inside the disks are for allowing the box lateral play on the ball. This improvement is applicable to pulleys, gearing, all kinds of wheels, and to mechanical movements generally on shafts running continuously through their hubs.

Having thus described my invention, I claim as new and desire to secure by Letters Patent—

A mechanism controlled by a ball and socket on a revolving shaft, by means of which pulleys, gearing, all kinds of wheels, and other mechanical movements may be actuated, substantially as shown and described.

JAS. R. DEVOR.

Witnesses:
 T. B. MOSHER,
 ALEX. F. ROBERTS.